United States Patent [19]

Gratzmuller

[11] Patent Number: 4,794,950
[45] Date of Patent: Jan. 3, 1989

[54] THREE-WAY HYDRAULIC VALVE

[76] Inventor: Claude A. Gratzmuller, 30, avenue georges Mandel, 75116 Paris, France

[21] Appl. No.: 184,938

[22] Filed: Apr. 22, 1988

[30] Foreign Application Priority Data

Apr. 29, 1987 [FR] France .................................. 87 06077

[51] Int. Cl.$^4$ ............................................ F15B 13/042
[52] U.S. Cl. .............................. 137/596.18; 91/417 R; 251/297
[58] Field of Search .................. 91/417 R; 137/596.18; 251/297

[56] References Cited

U.S. PATENT DOCUMENTS 2,900,960  8/1959  Gratzmuller .................. 91/417 R X
4,026,523  5/1977  Gratzmuller ...................... 91/396 X
4,151,861  5/1979  Bohrdt et al. .................. 251/297 X Primary Examiner—Gerald A. Michalsky
Attorney, Agent, or Firm—Max Fogiel

[57] ABSTRACT

An open-center three-way hydraulic valve as applicable to hydraulic control circuits of electric circuit-breakers comprises an admission valve-head which is restored to the closed position by a first spring, a drain valve-head which is displaced toward the closed position by a pilot valve, a second spring which is more powerful than the first and tends to close the drain valve-head, and a resilient semi-locking mechanism for retaining the drain valve-head in the open position in opposition to the second spring when the pilot jack is not under pressure.

6 Claims, 3 Drawing Sheets

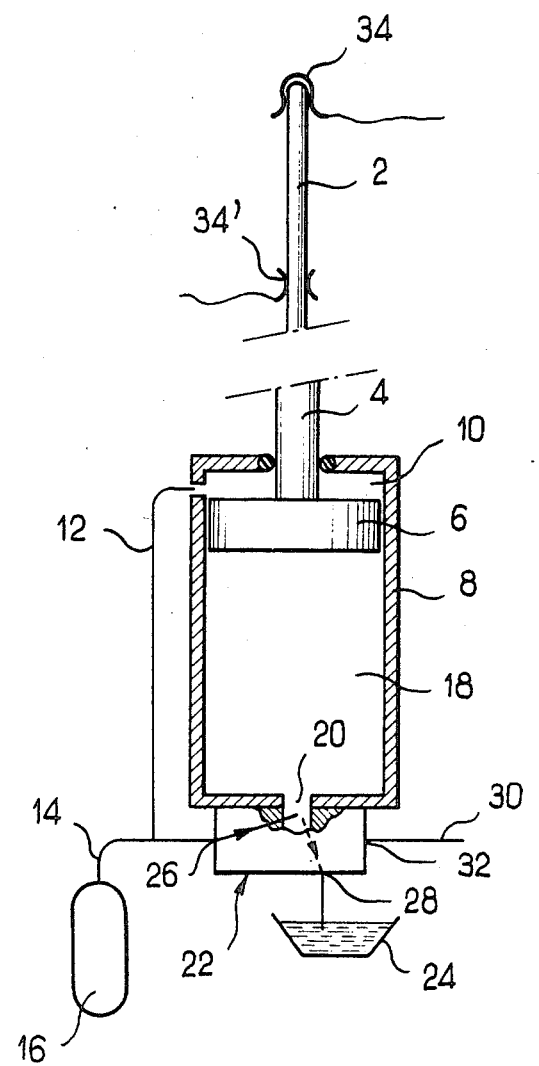
FIG_1

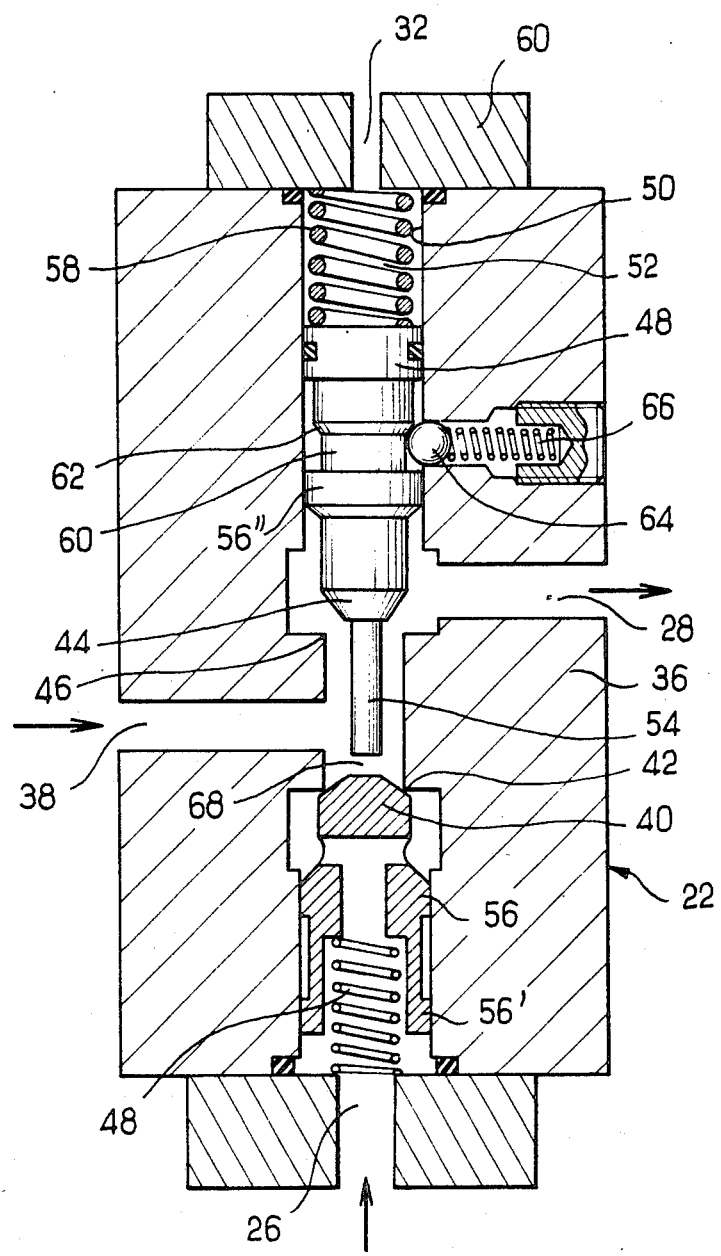
FIG_2

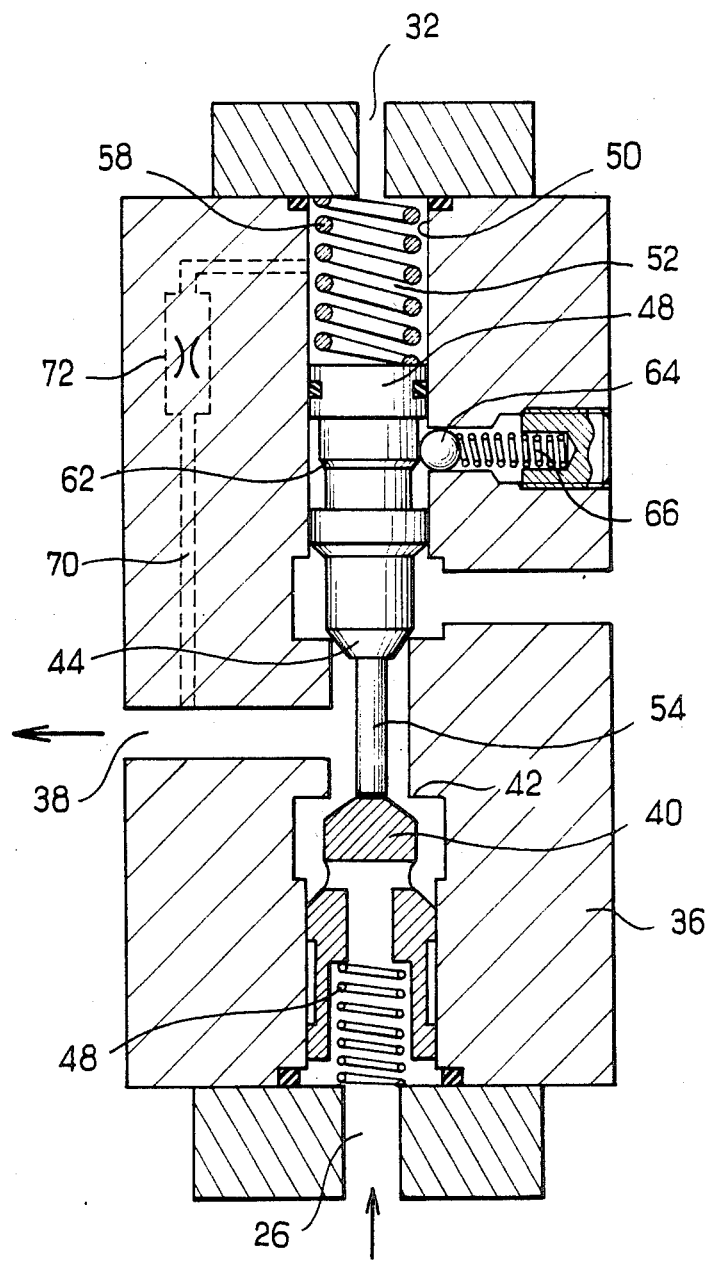
FIG_3

THREE-WAY HYDRAULIC VALVE

BACKGROUND OF THE INVENTION

1. Field of the Invention

This invention relates to an open-center three-way hydraulic valve for selectively connecting a utilization circuit either to a high-pressure source (admission position) or to a low-pressure tank (drain position), said valve being actuated hydraulically by a hydraulic pilot jack which is put into communication via a control circuit either with a high-pressure source or with a low-pressure tank so as to bring the valve into one position or the other.

A valve of this type finds a particularly important application in the case of hydraulic control of high-voltage electric circuit-breakers. As a rule, the valve is provided in this case with a so-called "self-maintaining" hydraulic circuit for applying a transient pressure signal to the aforesaid control circuit of the pilot jack. The function of this self-maintaining circuit is to maintain the valve in the position (admission or drain position) to which it has been brought by the transient pressure signal aforesaid after disappearance of this pressure signal.

2. Description of the Prior Art

The valve considered in the foregoing has been described in French Pat. No. 1,098,565 filed on Jan. 15th, 1954 (or in U.S. Pat. No. 2,900,960) and has come into standard use for the hydraulic control of high-voltage electric circuit-breakers.

Since a valve of this type has to be absolutely leak-tight in both the admission position and the drain position, the valve does not have any slide-valves but is provided with closure members or so-called valve-heads, namely an admission valve-head and a drain valve-head.

In the conventional design, it is necessary in the interest of good preservation and reliability to ensure that the admission and drain valve-heads are perfectly guided so that application of the closure members against their respective valve-seats should always take place on the same imprints. As a result, the two valve-heads are physically independent and interact with each other solely by exerting a thrust force. The admission valve-head which is movable on the high-pressure supply side with respect to the valve-seat is displaced by a spring and the drain valve-head on the low-pressure supply side with respect to its valve-seat is displaced by said hydraulic pilot jack.

Thus in the event of lack of pressure in the high-pressure source, the admission valve-head is closed under the action of its spring and the drain valve-head is opened. In the event of pressurization of the high-pressure source, the valve is leak-tight and does not prevent pressurization since the admission valve-head is closed and there is no communication between the high pressure and the drain tank.

In the case of application to the control of high-voltage circuit-breakers, a particular feature of these valves lies in the fact that, at the time of initiation of a circuit-breaker trip which corresponds to the drain position, the operating time-delay must be as short as possible, namely of the order of one millisecond. In consequence, the distance of travel between the closed drain position and the closed admission position is of the order of a few tenths of a millimeter (of the order of one-quarter of the diameter of the orifice of the valve-seats), which also has the effect of reducing leakage during transition through the intermediate positions between the admission position and the drain position (valve with open center).

In conclusion, in the event of disappearance of pressure in the high-pressure source, a conventional valve of this type naturally takes up a stable position which is the "drain" position.

In many hydraulic circuit-breaker-control systems, a differential jack is employed for actuating the moving contact of the circuit-breaker. In a jack of this type, the annular jack chamber is continuously subjected to the high pressure of the source in order to urge the circuit-breaker continuously toward its open position. One example of a hydraulic control system of this type has been described and illustrated in French Pat. No. 2,317,532 filed on July 7th, 1975 (or in U.S. Pat. No. 4,026,523).

However, as will be seen in greater detail in the description which now follows, when this known type of valve is employed for controlling the supply/discharge of a differential jack of this type, operation of the circuit-breakers is subject to certain disadvantages (low-speed operation) in the event of a decrease or a reduction to zero of the pressure in the pressure source.

It is therefore necessary as a general rule to provide a system which initiates automatic tripping of the circuit-breaker in the event of a fall in pressure below a predetermined threshold value so as to avoid any low-speed operation of the circuit-breaker.

In certain electric power distribution systems, however, automatic trips of circuit-breakers are found unacceptable and it is preferred on the contrary to maintain the circuit-breakers in the closed position.

It is for this reason that systems have been provided for locking the circuit-breakers themselves in the closed position but this is complicated from the point of view of construction and in fact has the effect of reducing safety. Devices have also been proposed for ensuring in certain cases that the valve is prevented from returning to its rest position (drain position corresponding to the open position of the circuit-breaker), particularly in the event of a drop in supply pressure. Devices of this type, however, are difficult to construct and fail to offer reliable operation, particularly on account of the short distance of travel of the valve-heads as mentioned earlier.

The aim of the present invention is to overcome these drawbacks by means of a three-way valve which has two stable positions, namely a drain position and an admission position.

SUMMARY OF THE INVENTION

The invention relates to an open-center three-way hydraulic valve having an admission valve-head and a drain valve-head which are physically independent but cooperate with each other in a movement of thrust, the admission valve-head being urged toward the closed position by a spring and the drain valve-head being displaced toward the closed position by a hydraulic pilot jack. The valve in accordance with the invention is distinguished by the fact that the drain valve-head is also subjected to the action of a second spring which also urges said drain valve-head to the closed position in opposition to the first spring of the admission valve-head, said second spring being preponderant with respect to said first spring and therefore having a tendency to maintain the valve in the admission position in the absence of hydraulic pressure, and that the drain valve-head is provided with a resilient semi-locking mechanism having limited resistance which retains said drain valve-head in the open position in opposition solely to the force of the second spring which tends to close said valve-head but which frees said valve-head toward the closed position under the combined action of said second spring and of the thrust of the hydraulic pilot jack.

The foregoing arrangements permit the construction of a bistable valve which is capable of remaining in either of its positions (admission or drain) to which it has been deliberately brought by its hydraulic pilot jack.

BRIEF DESCRIPTION OF THE DRAWINGS

FIG. 1 is a schematic representation of a hydraulic circuit-breaker control system to which the valve in accordance with the invention applies.

FIG. 2 is a sectional view of the valve in accordance with the invention in the drain position.

FIG. 3 is a sectional view of the same valve in the admission position.

DETAILED DESCRIPTION OF THE INVENTION

A hydraulic circuit-breaker control system to which the valve in accordance with the invention applies is shown diagrammatically in FIG. 1.

The moving contact 2 of the circuit-breaker is coupled to the emergent rod 4 of the piston 6 of a differential jack 8. The annular chamber 10 of the differential jack is permanently connected by means of pipes 12, 14 to an oleopneumatic accumulator 16 which constitutes the high-pressure source.

The main chamber 18 of the jack has an admission/drain orifice 20 which can be selectively connected by means of a three-way valve 22 either to the accumulator 20 or to a low-pressure tank 24. In the first configuration, the valve 22 establishes a communication between the orifice 20 and an admission inlet 26 of the valve((admission position represented by a full line). In the second configuration, the valve 22 establishes a communication between the orifice 20 and a drain outlet 28 of the valve (drain position represented by a dashed line).

Changeover of the valve 22 from one of its positions to the other is carried out by a hydraulic control circuit 30 which terminates in a control inlet 32 of the valve 22.

In the position shown in FIG. 1, the valve is in the admission position, the circuit-breaker is in the closed position, and the moving contact 2 has the function of joining the stationary contacts 34, 34'. In order to bring the circuit-breaker to the open position, it is only necessary to place the valve 22 in the drain position since the high pressure which prevails within the chamber 10 produces a downward displacement of the piston 6 and moves the moving contact 2 away from the stationary contact 34.

A hydraulic control system of this type for circuit-breakers is well-known and has been described, for example (with reference to FIG. 3) in French Pat. No. 2,317,532 filed on July 7th, 1975 (or in U.S. Pat. No. 4,026,523).

The valve 22 shown in cross-section in FIG. 2 is made up of the following known elements: a valve body 36 provided with different bores which define a utilization orifice 38 or admission/drain orifice which is connected to the admission/drain orifice 20 of the jack 8 (FIG. 1), an admission orifice 26, a drain orifice 28 and a control-pressure orifice 32.

In an axial bore of the valve body 36 are housed an admission valve-head 40 which is adapted to cooperate with a valve-seat 42 and a drain valve-head 44 which is adapted to cooperate with a valve-seat 46.

The admission valve-head 40 is urged toward the closed position by a spring 48. The drain valve-head 44 is rigidly fixed to a piston 49 slidably mounted within a bore 50 which constitutes the cylinder of the hydraulic pilot jack of the valve. The chamber 52 of the pilot jack receives via the orifice 32 the high-pressure or low-pressure control signal emitted by the control circuit 30.

As is apparent from FIG. 2, the two valve-heads 40 and 44 are two physically independent parts which act on each other solely in a movement of thrust exerted by means of a push-rod 54 which is rigidly fixed to one of the valve-heads, namely the drain valve-head 44 in the example shown.

It is also worthy of note that the valve-heads are guided in sliding motion within their respective bores by means of annular guide bosses 56, 56', 56'', thereby ensuring that said valve-heads are perfectly guided onto their respective valve-seats.

All the elements described in the foregoing are conventional elements which exist in a known valve for the control of circuit-breakers. It is apparent that, when provision is made only for a spring 48 which acts on the admission valve-head 40, a known valve of this type comes substantially into the position shown in FIG. 2 in the rest condition and under zero pressure, that is to say the position in which the admission valve-head 40 is closed and the drain valve-head 44 is open.

In the event, however, that a known valve of this type is employed for controlling a differential jack such as the jack of FIG. 1, this valve is attended by a disadvantage. In fact, assuming that the circuit-breaker is in the closed position and that a pressure drop occurs in the high pressure source (for example as a result of leakage), the circuit-breaker remains in the closed position since the same pressure (although lower than the normal high pressure) is exerted on both faces of the piston 6 of the main jack 8 (FIG. 1). Should the pressure fall to zero, the valve returns to its rest position under the action of the restoring spring of the admission valve-head or in other words returns to the drain position (admission valve-head closed, drain valve-head open).

In this condition, when the hydraulic circuit is repressurized, the pressure is established within the differential jack 8 (FIG. 1) solely within the annular chamber 10 since the main chamber 18 is connected to the drain outlet by means of the valve 22, with the result that the circuit-breaker moves slowly from its closed position to its open position. This, however, is unacceptable and accordingly dictates the need to provide a safety system such as an automatic trip control in the event of a pressure drop.

In addition to the known elements which have just been described, the valve in accordance with the invention is provided with a second spring 58 which is applied on the one hand against a portion 60 of the valve body and against the top face of the pilot piston 49 in order to urge the drain valve-head 44 to the closed position. Thus the two valve-heads (40, 44) are each subjected to the action of a spring (48, 58) which tends to apply the valve-head against its seat. In accordance with the invention, however, the spring 58 of the drain valve-head 44 is more powerful than the spring 48 of the supply valve-head, with the result that the valve-head assembly tends to take up the stable position shown in FIG. 3 with the drain valve-head 44 in the closed position and the admission valve-head 40 in the open position.

Furthermore, the valve in accordance with the invention is provided with a resilient mechanism for semi-locking of the drain valve-head. This mechanism has a limited resistance which is adapted to retain the drain valve-head 44 in the open position (as shown in FIG. 2) in opposition to the force of the spring 58 which tends to close this latter in the absence of any control hydraulic pressure on the piston 48 of the pilot jack 50. However, this resistance is not sufficient to retain the drain valve-head in the open position when this latter is subjected to the thrust of the pilot piston in addition to the action of the spring 58, thus having the effect of moving the drain valve-head 44 to the closed position (as shown in FIG. 3) and consequently of moving the admission valve-head 40 to the open position.

In the embodiment shown in FIGS. 2 and 3, this semi-locking mechanism is provided on the one hand with a ramp 62 formed on the rod 60 of the drain valve-head 44 and on the other hand with a resilient thrust unit mounted within the valve body 36. Preferably, said resilient thrust unit is constituted by one or a number of balls 64 applied by a spring 66 against the rod 60 of the drain valve-head.

The operation of the valve is sufficiently clear from the foregoing to require no comment beyond the fact that, in the drain position (FIG. 2) which corresponds to the open position of the circuit-breaker, the pressure within the chamber 52 of the pilot jack is zero, and that the drain valve-head 44 is retained in the open position by the bearing force applied by the ramp 62 against the ball 64, the force of the spring 58 alone being insufficient to overcome the resistance of the ball 64 against the ramp. Since the drain valve-head is open, the admission valve-head 40 is allowed to move upward under the action of its spring 48 and is thus closed.

In order to close the circuit-breaker, the pressure order is sent into the pilot jack. As a result of the combined action of pressure on the pilot piston 49 and of the spring 58, the ramp 62 is capable of overcoming the force exerted on the ball 64 by the spring 66. The drain valve-head 44 therefore comes into the closed position (FIG. 3) and displaces the admission valve-head 40 in opposition to its spring 48 under the action of a downward thrust exerted by the end of the rod 54. The admission valve is therefore caused to open and the high pressure admitted through the inlet 26 is transmitted through the utilization orifice 38 to the main chamber 18 of the differential jack 8 (as shown in FIG. 1). The circuit-breaker therefore moves to the closed position.

In order to initiate a circuit-breaker trip, the pilot jack 50 is connected to discharge by means of the control circuit 30. The high pressure prevailing within the utilization circuit produces a powerful upward thrust on the assembly consisting of drain valve-head and pilot jack piston in opposition to the spring 58. The piston withdraws to its end-of-travel stop (for example by abutting application of the guide boss 56" against the ball or any other travel-limiting system) and the drain valve-head 44 remains in the open position by reason of the fact that the ramp 62 is locked in position against the ball 64. At the same time, the admission valve-head 40 which is freed from the thrust of the drain valve-head accordingly closes under the combined action of the high pressure and of its restoring spring 48 (FIG. 3). The main chamber 18 of the differential jack 8 (FIG. 1) is thus connected to discharge and the moving contact of the circuit-breaker is moved back to the open position under the action of the permanent high pressure maintained on the annular face of the piston 6.

In the event that a slow pressure drop takes place within the hydraulic circuit when the circuit-breaker is in the closed position (valve in the admission position as shown in FIG. 3), the pressure also drops within the pilot jack 50 but the valve-heads 44 and 40 remain in the same position by virtue of the force of the preponderant spring 58 of the drain valve-head. The differential jack 8 is therefore not connected to discharge and the circuit-breaker remains in the closed position.

When the pressure of the hydraulic circuit is restored (the valve being in the admission position), the main chamber 18 of the differential jack is supplied at the same time as the annular chamber 10 of said jack, with the result that there is no attendant danger of slow opening of the circuit-breaker as was the case with a three-way valve of known type.

It is therefore apparent that there is no need to provide any system for automatic initiation of a circuit-breaker trip in the event of a pressure drop or any device for inhibiting said system in order to maintain the circuit-breaker in the closed position.

The valve in accordance with the invention therefore has two stable positions) admission and drain positions).

One of the difficulties involved in the construction of a valve-head locking system in a three-way valve for the control of circuit-breakers arose from the fact that the lift of the valve-heads is very small (in order to obtain a very fast response) as was recalled in the introductory part of this specification.

It is essential to not that the two valve-heads of a valve in accordance with the invention are separate components and that he semi-locking mechanism produces action on the drain valve-head alone.

While complying with the condition of small lift of the admission valve-head 40 which necessary in order to obtain a circuit-breaker tripping time of short duration, the displacement of the drain valve-head 44 can be relatively substantial. This makes it possible to establish a reliable semi-locking mechanism for the assembly consisting of drain valve-head and auxiliary jack piston without entailing any delicate compromise. So far as the circuit-breaker closing operation is concerned, there is no imperative time-delay, the sole condition to be met being the need for a constant value.

It is for this reason that, as shown in FIGS. 2 and 3, the drain valve-head 44 is provided with a longer range of travel than the admission valve-head 40. For the same reason and as shown in FIG. 2, there exists in the drain position a clearance or dead range of travel 68 between the bottom end of the push-rod 64 of the drain valve-head and the top face of the admission valve-head 40.

In hydraulic control systems for electric circuit-breakers to which the valve in accordance with the invention is more particularly applicable, the pressurization (or depressurization) order applied to the pilot jack 50, 49 of the three-way valve is only a transient signal which is subsequently maintained by a hydraulic circuit designated as a "self-maintaining circuit". A self-maintaining circuit o this type is well-known and has been described in French Pat. No. 1,098,565 (or U.S. Pat. No. 2,900,960) cited earlier. This circuit may be incorporated with the valve in accordance with the invention as shown in dashed outline in FIG. 3 and includes a duct 70 in which is interposed a flow-limiting device 72. Said duct 70 puts the utilization duct 38 of the valve into communication with the chamber 52 of the pilot jack 50, 49.

What is claimed is:

1. An open-center three-way hydraulic valve in particular for the hydraulic control circuit of an electric circuit-breaker in which the moving contact is actuated by a differential jack, comprising an admission valve-head and a drain valve-head which are physically independent but interact with each other in a movement of thrust, said admission valve-head being urged toward the closed position by a spring and said drain valve-head being actuated toward the closed position by pressurization of a hydraulic pilot jack, wherein said valve has a second spring which produces action on the drain valve-head so as to urge said valve-head to the closed position, wherein said second spring is more powerful than the first spring and wherein provision is made on the drain valve-head for a resilient semi-locking mechanism having limited resistance which is adapted to retain the drain valve-head in the open position in opposition to the action of the second spring in the absence of hydraulic pressure within the pilot jack and which is adapted to release said valve-head up to its closed position when said valve-head is subjected both to the action of said second spring and to the action of the pressurized pilot jack.

2. A valve according to claim 1, wherein the semi-locking mechanism is provided with a projecting ramp on a coupling rod having the function of connecting the drain valve-head to the piston of the pilot jack and is provided with at least one resilient thrust unit carried by the body of said valve and adapted to cooperate with said ramp.

3. A valve according to claim 2, wherein the aforesaid thrust unit includes at least one ball which is urged by a spring toward the coupling rod of the drain valve-head.

4. A valve according to claim 1, wherein the drain valve-head has a longer range of travel than the admission valve-head.

5. A valve according to claim 4, wherein the drain valve-head exerts thrust on the admission valve-head by means of a push-rod rigidly fixed to one of the valve-heads and wherein the extremity of the push-rod is located at a distance from the other valve-head in the drain position of the valve.

6. A valve according to claim 1, wherein a self-maintaining circuit is incorporated in the valve body.

* * * * *